US00RE37236E

(19) United States
(12) Reissued Patent
Brüstle et al.

(10) Patent Number: US RE37,236 E
(45) Date of Reissued Patent: Jun. 26, 2001

(54) HINGE POT

(76) Inventors: Klaus Brüstle, Rüttenen 5, A-6973 Höchst; Helmut Rupprechter, Sandgasse 5b, A-6923 Lauterach, both of (AT)

(21) Appl. No.: 08/964,205

(22) Filed: Nov. 4, 1997

Related U.S. Patent Documents

Reissue of:
(64) Patent No.: 5,463,796
Issued: Nov. 7, 1995
Appl. No.: 08/192,828
Filed: Feb. 7, 1994

(30) Foreign Application Priority Data

Feb. 8, 1993 (AT) ..... 218/93
Sep. 10, 1993 (AT) ..... 1834/93

(51) Int. Cl.[7] ..... E05D 7/12
(52) U.S. Cl. ..... 16/383
(58) Field of Search ..... 16/383, 384, 382, 16/370; 403/119, 231

(56) References Cited

U.S. PATENT DOCUMENTS 4,361,931 * 12/1982 Schnelle et al. ..... 16/383

FOREIGN PATENT DOCUMENTS 19 04 781 8/1970 (DE) ..... 16/384
25 24 503 12/1976 (DE) ..... 16/383
28 37 327 3/1980 (DE) ..... 16/383
1550119 * 12/1968 (FR) ..... 16/383
2 027 482 2/1980 (GB) ..... 16/384

* cited by examiner

*Primary Examiner*—Anthony Knight

(57) ABSTRACT

A hinge pot has a housing which can be inserted into a bore in a furniture part and dowel-type expandable clamping jaws which can be inserted in the bore and which can be pressed against the bore wall by way of expanding members constructed as tie rods. The expanding members are movable by way of an eccentric lever in the direction of insertion of the hinge pot perpendicular to the plane of mounting thereof. The clamping jaws are cylinder sections of visco-elastic material. The expanding members are metal, are located between the hinge pot and the respective clamping jaws, and have hooks at their free ends. Opposite the hooks are provided contact pressure cams which are supported against a housing wall of the hinge pot.

24 Claims, 3 Drawing Sheets

HINGE POT

Matter enclosed in heavy brackets [ ] appears in the original patent but forms no part of this reissue specification; matter printed in italics indicates the additions made by reissue.

BACKGROUND OF THE INVENTION

The invention relates to a hinge pot having a housing which can be inserted into a bore in a furniture part and having dowel-type expanding clamping jaws which can be inserted into the bore and which can be pressed against the bore wall by way of expanding members constructed as tie rods. The expanding members are movable by way of an eccentric lever in the direction of insertion of the hinge pot perpendicular to the plane of mounting thereof. Expansion of the clamping jaws takes place when the expanding members are moved by the lever in a direction from an insertion end of the hinge pot towards a mounting face thereof.

Securing furniture fittings by means of dowels or dowel-type clamping members has the advantage, in contrast to securing by means of screws, of better holding capacity or anchoring force and is the conventional type of securing according to the current state of the art.

SUMMARY OF THE INVENTION

The object of the invention is to improve a hinge pot of the type mentioned at the outset but which can be mounted and also detached again without the use of a tool, such that it can be mounted advantageously both in chipboard and in hardwood.

This object is achieved according to the invention in that the clamping jaws are to have a cylinder segment-shaped configuration of visco-elastic material, for example plastic or rubber, and are arranged on the casing of the hinge pot, and in that the tie rods are arranged between the hinge pot and the clamping jaws.

BRIEF DESCRIPTION OF THE DRAWINGS

An embodiment of the invention will be described in detail below with reference to the attached drawings, wherein.

DETAILED DESCRIPTION OF THE INVENTION

Figure 1:
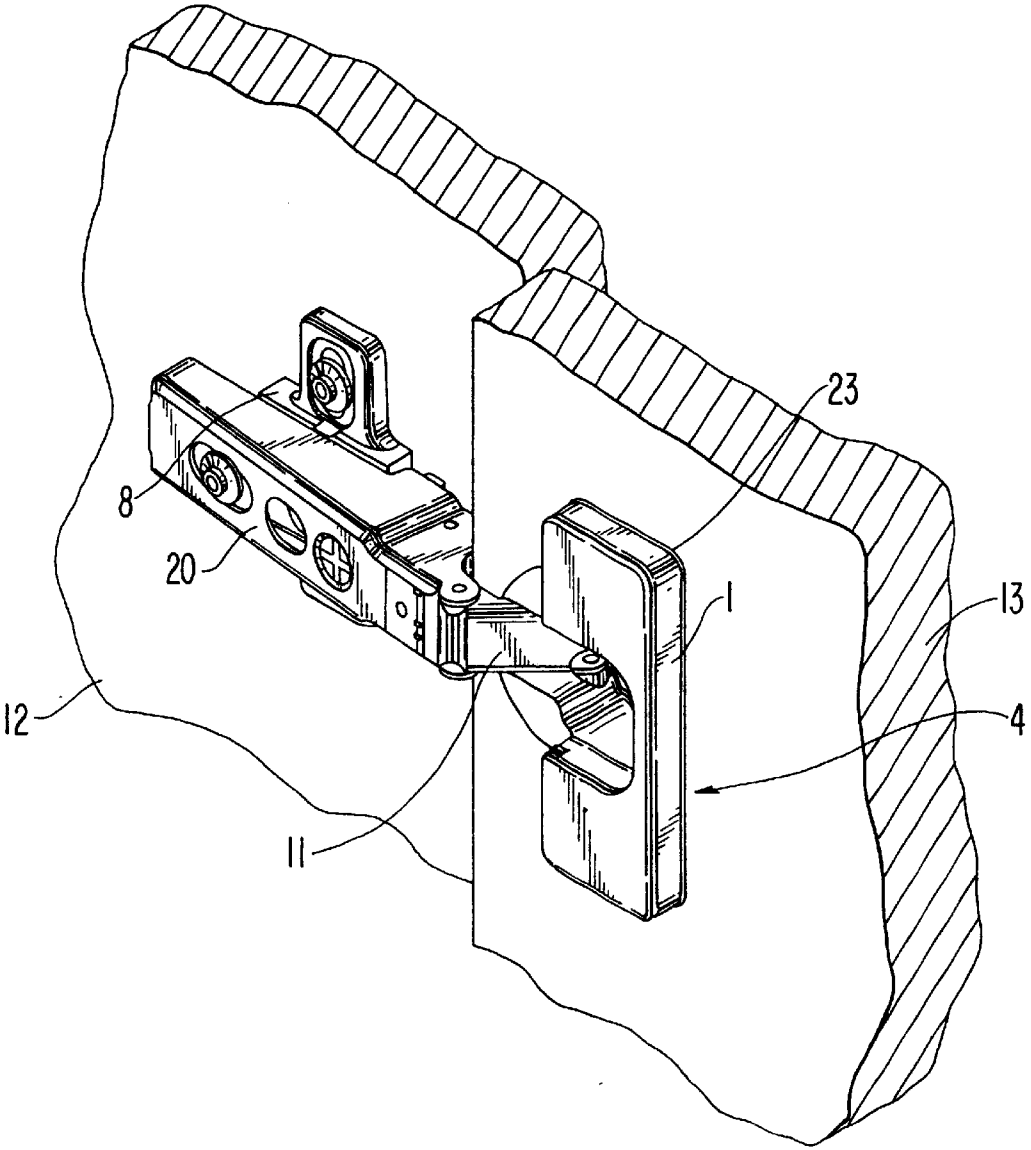
FIG. 1 is a perspective view of a hinge.

FIG. 1 shows a hinge which has a hinge pot 4 which is connected to a hinge arm 20 by way of an articulated lever 11. The hinge pot 4 can be inserted into a bore 16 (FIG. 3) in a door panel 13 and has a flange 23 which is covered by a bracket 1. The bracket 1 has two eccentric levers 1'. Tie rod-like expanding parts or members 2 are connected to the bracket 1 by means of pins 5. The hinge arm 20 is connected in conventional manner to a base plate 8. The base plate 8 has dowels which can be inserted in bores in a furniture side wall 12.

In the illustrated arrangement, the hinge pot 4, which is preferably produced from metal, for example a die casting, or from sheet metal, is provided laterally with clamping jaws 21 [or] *of* plastic or rubber. The clamping jaws 21 are visco-elastic or rubber-elastic and are pressed in flat manner against the wall of the bore 16 on clamping of the hinge pot 4. The expanding parts 2 are arranged between the clamping jaws 21 and the hinge pot 4.

Figure 2:
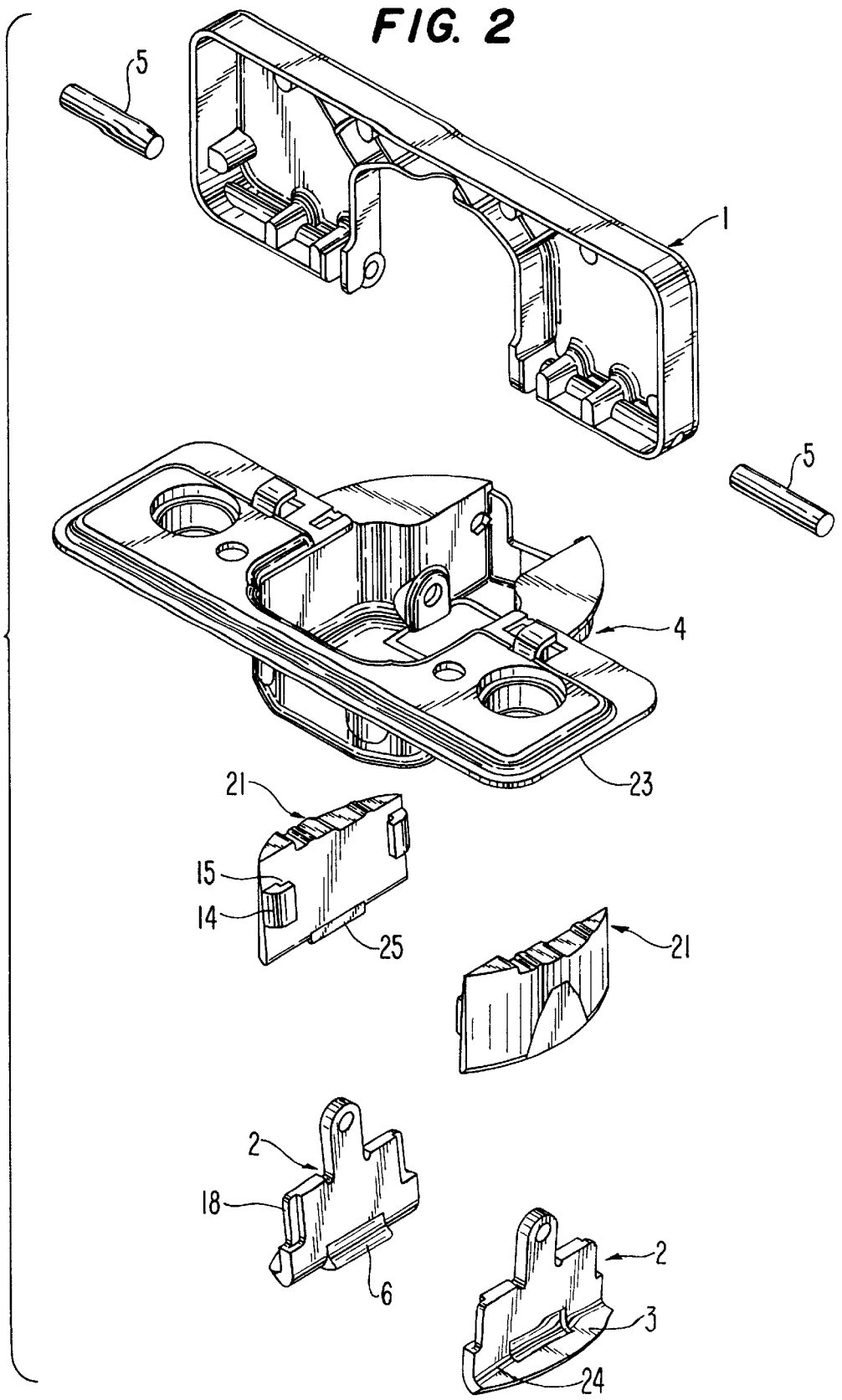
FIG. 2 is an exploded view of a hinge pot of the hinge of FIG. 1.
Figure 3:
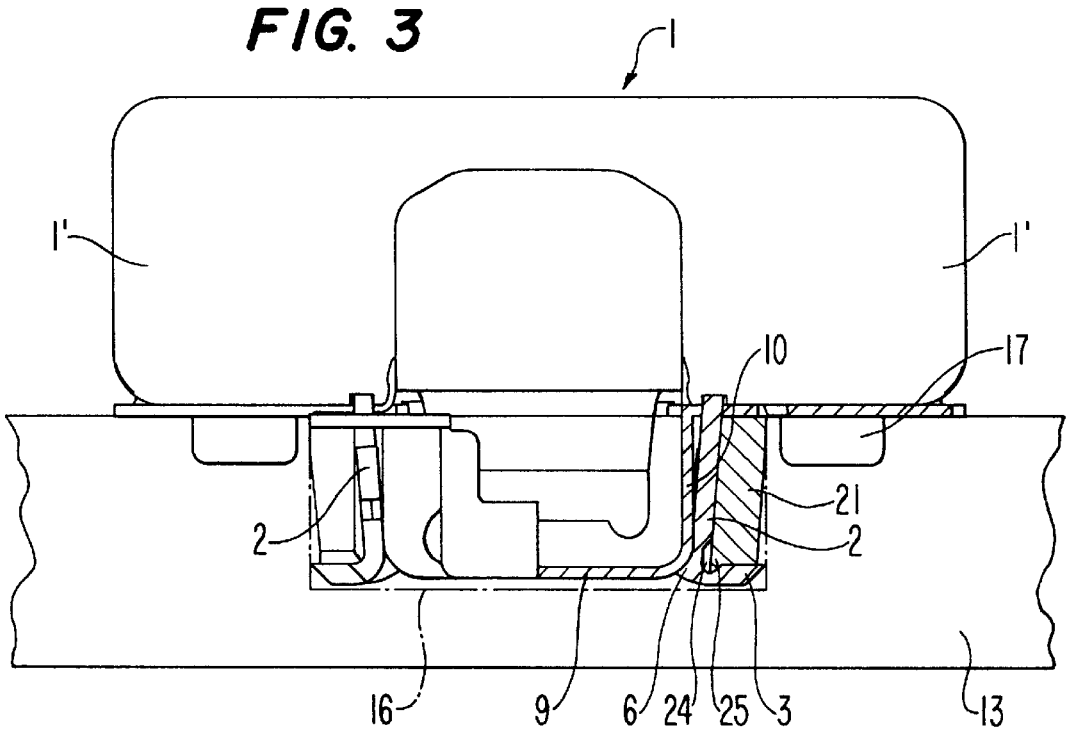
FIG. 3 is a longitudinal section through the hinge pot when in a stress-free state.
Figure 4:
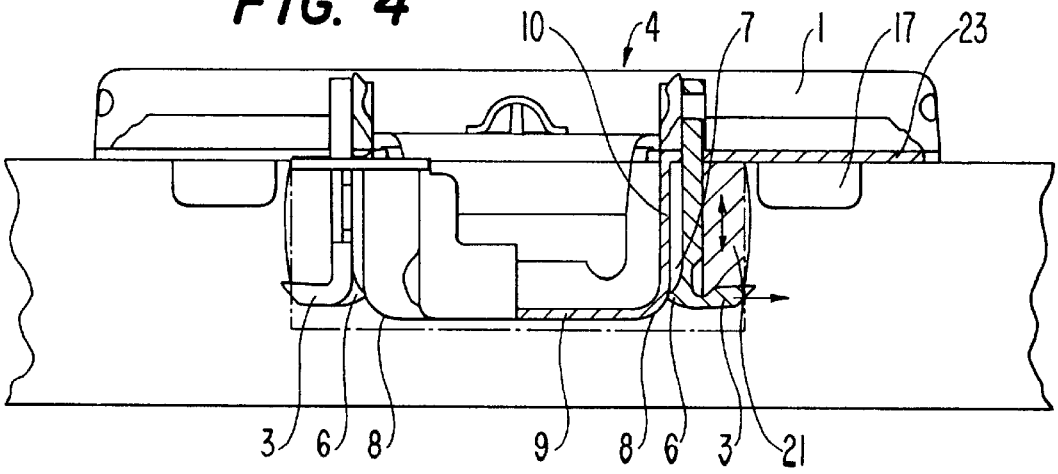
FIG. 4 is a similar longitudinal section, the hinge pot being shown clamped in a bore in a furniture part.

In the embodiment according to FIGS. 2 to 4, the expanding parts 2 are provided at their inner free ends with protruding pointed hooks 3. Opposite the hooks 3, expanding parts 2 have contact pressure cams 6 which are supported against the hinge pot wall.

When the bracket 1 is pivoted or folded over, i.e. pressed onto the flange 23, the expanding parts 2 are drawn upwardly, i.e. moved out of the bore 16 and towards the flange 23. The contact pressure cam 6 has an upper concave delimitation surface 7, which, in the unclamped position (FIG. 3), bears against a curved surface 8 which forms a transition from base 9 of the hinge pot 4 to side wall 10 thereof. If the bracket 1 is folded over or pivoted and the expanding parts 2, as described above, are drawn or pulled upwardly, the contact pressure cam 6 is moved upwards (as shown in the drawings) along the curved surface 8 and the expanding part 2 thus is pressed outwards towards the wall of the bore 16. As a result, on the one hand the clamping jaws 21 are pressed against the wall of the bore 16 and on the other hand points of the hooks 3 are driven into the wall. Pressing contact of the clamping jaws 21 against the wall of the bore 16 is further reinforced by the clamping jaws 21 being compressed vertically by the outward pulling of the expanding parts 2, and thus the material of clamping jaws 21 is further pressed outwards.

The clamping jaws 21 effect a good holding in a chipboard material as a result of their flat pressing contact against the wall of the bore 16. The effect of the hooks 3 can here be left out of consideration. However, if the hinge pot 4 is inserted into a door panel of solid wood, its holding is effected in particular by the hooks 3, which cut into the wall of the bore 16.

As can be seen in FIG. 2, the hooks 3 are constructed to have a segmental configuration, just like the clamping jaws 21. The clamping jaws 21 have lateral projections 14 in which are provided grooves 15 in which marginal webs 18 of the expanding parts 2 are guided.

Centering pegs 17 which prevent any rotation of the hinge pot 4 are advantageously constructed on the flange 23 of the hinge pot 4. Polyurethane or rubber, for example, are suitable materials for the clamping jaws 21. Each hook 3 has formed therein a notch 24 into which projects a lug 25 formed of the respective clamping jaw 21. In the clamped position, the flange 23 is covered by the bracket 1 and the pot region of the hinge pot 4 is left completely free.

The bracket 1, which is mounted on a diametral line of the hinge pot 4 extending parallel to the hinge spindles, is constructed as a handle for withdrawing the hinge pot 4 from the bore 16 of the door panel 13.

We claim:

1. A hinge pot assembly capable of being detachably connected to a furniture part, said assembly comprising:

a housing to be inserted into a bore in the furniture part clamping jaws insertable with said housing into the bore, said clamping jaws being formed of visco-elastic material and being capable of being clamped against a wall of the bore, each said clamping jaw having the shape of a segment of a cylinder;

a lever movable relative to said housing between an open, outer position and a closed, inner position;

metal expanding members arranged between said housing and respective said clamping jaws, each said expanding member having an inner free end having a hook directed away from said housing in a direction to be toward the wall of the bore, each said expanding member having an outer end connected to said lever at a position such that, as said lever is moved relative to said housing from said open, outer position to said closed, inner position, said expanding members are caused to move relative to said housing in a direction from an inner end thereof to an outer end thereof and to be outwardly of the bore, and said expanding members having structure to cause, upon said expanding members moving in said direction, said expanding members to impart to said clamping jaws an outward clamping force to be directed against the wall of the bore and moving said clamping jaws to clamping positions; and said hook of each said expanding member projecting outwardly beyond the respective said clamping jaw when said clamping jaw is in said clamping position thereof.

2. An assembly as claimed in claim 1, wherein said material of said clamping jaws comprises plastic or rubber.

3. An assembly as claimed in claim 1, wherein each said clamping jaw has a lug projecting into a notch in the respective said expanding member.

4. An assembly as claimed in claim 1, wherein each said expanding member has a generally L-shaped configuration including a portion positioned inwardly of the respective said clamping jaw, such that said jaw is compressed axially upon movement of said expanding member in said direction.

5. An assembly as claimed in claim 1, wherein said structure comprises a cam on each said expanding member at a side thereof opposite the respective said hook, said cam contacting said housing.

6. An assembly as claimed in claim 5, wherein said housing has a base, a side wall and a curved transition surface therebetween.

7. An assembly as claimed in claim 6, wherein said cam has a concave upper surface complementary to said curved transition surface.

8. An assembly as claimed in claim 1, further comprising a flange extending outwardly from an outer end of said housing, said flange having therein openings through which extend respective said expanding members.

9. An assembly as claimed in claim 8, further comprising centering pegs extending from an underside of said flange.

10. An assembly as claimed in claim 1, wherein each said hook has a segment shaped configuration when viewed in plan.

11. An assembly as claimed in claim 1, wherein each said clamping jaw has lateral projections between which is guided the respective said expanding member.

12. An assembly as claimed in claim 11, wherein said lateral projections have therein grooves into which extend webs of said respective expanding member.

13. An assembly as claimed in claim 1, wherein said lever has the configuration of a handle to enable withdrawal of said assembly when said lever is in said open, outer position.

14. An assembly as claimed in claim 1, wherein said lover is mounted approximately along a diameter of said housing.

*15. A hinge pot assembly capable of being detachably connected to a furniture part, said assembly comprising:*

*a metal housing to be inserted into a bore in the furniture part;*

*clamping jaws insertable with said housing into the bore, said clamping jaws being formed of plastic or rubber material and being capable of being moved relative to said housing to a clamping position to be clamped against a wall of the bore, and each said clamping jaw having the shape of a segment of a cylinder;*

*said clamping jaws being supported by respective metal L-shaped expanding members, each said L-shaped expanding member including a first portion arranged between said housing and the respective said clamping jaw and a hook portion extending from said first portion in a direction away from said housing and to be toward the wall of the bore, with each said clamping jaw resting on a respective said hook portion, and each said hook portion having a free end projecting outwardly beyond the respective said clamping jaw when said clamping jaw is in said clamping position thereof; and*

*a lever movable relative to said housing between an open, outer position and a closed, inner position to cause said L-shaped expanding members to impart to said clamping jaws an outward clamping force to be directed against the wall of the bore and moving said clamping jaws to said clamping position.*

*16. An assembly as claimed in claim 15, wherein each said clamping jaw has a lug projecting into a notch in the respective said L-shaped expanding member.*

*17. An assembly as claimed in claim 15, wherein each said L-shaped expanding member has a cam at a side thereof opposite the respective said clamping jaw.*

*18. An assembly as claimed in claim 15, wherein each said hook portion has a segment shaped configuration when viewed in plan.*

*19. An assembly as claimed in claim 15, wherein each said clamping jaw has lateral projections between which is guided said first portion of the respective said L-shaped expanding member.*

*20. An assembly as claimed in claim 19, wherein said lateral projections have therein grooves into which extend webs of said first portion.*

*21. An assembly as claimed in claim 15, further comprising a flange extending outwardly from an outer end of said housing.*

*22. An assembly as claimed in claim 21, wherein said flange has therein openings through which extend said first portions of said L-shaped expanding members.*

*23. An assembly as claimed in claim 21, further comprising centering pegs extending from an underside of said flange.*

*24. An assembly is claimed in claim 21, wherein when said lever is in said outer position thereof said lever uncovers said flange, when said lever is in said inner position thereof said lever covers said flange, and said lever having the configuration of a handle to enable withdraw of said assembly when the lever is in said outer position thereof.*

* * * * *